US008576172B2

(12) United States Patent
Hill et al.

(10) Patent No.: US 8,576,172 B2
(45) Date of Patent: *Nov. 5, 2013

(54) POINTER TRACKING ACROSS MULTIPLE OVERLAPPING COORDINATE INPUT SUB-REGIONS DEFINING A GENERALLY CONTIGUOUS INPUT REGION

(75) Inventors: Douglas B. Hill, Calgary (CA); Scott Yu Tseng Su, Calgary (CA); David E. Holmgren, Calgary (CA)

(73) Assignee: SMART Technologies ULC (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/307,588

(22) Filed: Nov. 30, 2011

(65) Prior Publication Data

US 2012/0068955 A1 Mar. 22, 2012

Related U.S. Application Data

(63) Continuation of application No. 12/098,961, filed on Apr. 7, 2008, now Pat. No. 8,089,462, which is a continuation of application No. 10/750,219, filed on Jan. 2, 2004, now Pat. No. 7,355,593.

(51) Int. Cl.
*G06F 3/033* (2013.01)

(52) U.S. Cl.
USPC ........... 345/163; 345/157; 345/164; 345/165; 345/166; 345/167

(58) Field of Classification Search
USPC .................. 345/102, 104, 156–179, 205, 206, 345/419–428, 505, 619, 629, 633, 647; 382/232, 42, 154, 305; 715/209, 788; 715/201; 359/9; 348/E7.001, 36, 390.1
See application file for complete search history.

(56) References Cited

U.S. PATENT DOCUMENTS

| | | | |
|---|---|---|---|
| 2,769,374 A | 11/1956 | Sick | |
| 3,025,406 A | 3/1962 | Stewart et al. | |
| 3,128,340 A | 4/1964 | Harmon | |
| 3,187,185 A | 6/1965 | Milnes | |

(Continued)

FOREIGN PATENT DOCUMENTS

| | | |
|---|---|---|
| AU | 2003233728 A1 | 12/2003 |
| AU | 2006243730 A1 | 11/2006 |

(Continued)

OTHER PUBLICATIONS

International Preliminary Report on Patentability, PCT/NZ2004/000029, May 20, 2005 (21 pages).

(Continued)

*Primary Examiner* — Prabodh M Dharia
(74) *Attorney, Agent, or Firm* — Katten Muchin Rosenman LLP

(57) ABSTRACT

A touch system comprises overlapping coordinate input subregions defining a generally contiguous input surface. Each coordinate input sub-region generates pointer coordinate data in response to pointer contacts thereon. When a pointer contact is made on a region of a coordinate input sub-region that overlaps with an adjacent coordinate input sub-region, each overlapping coordinate input sub-region processes acquired images to derive pointer data and triangulates the position of the pointer using the derived pointer data. Thereafter, the triangulated positions generated by the overlapping coordinate input sub-regions are processed in accordance with defined logic thereby to determine the position of the pointer contact relative to the touch surface.

46 Claims, 11 Drawing Sheets

(56) References Cited

U.S. PATENT DOCUMENTS

| | | |
|---|---|---|
| 3,360,654 A | 12/1967 | Muller |
| 3,478,220 A | 11/1969 | Milroy |
| 3,613,066 A | 10/1971 | Cooreman |
| 3,764,813 A | 10/1973 | Clement et al. |
| 3,775,560 A | 11/1973 | Ebeling et al. |
| 3,857,022 A | 12/1974 | Rebane et al. |
| 3,860,754 A | 1/1975 | Johnson et al. |
| 4,243,879 A | 1/1981 | Carroll et al. |
| 4,420,261 A | 12/1983 | Barlow et al. |
| 4,459,476 A | 7/1984 | Weissmueller et al. |
| 4,468,694 A | 8/1984 | Edgar |
| 4,550,250 A | 10/1985 | Mueller et al. |
| 4,553,842 A | 11/1985 | Griffin |
| 4,558,313 A | 12/1985 | Garwin et al. |
| 4,672,364 A | 6/1987 | Lucas |
| 4,673,918 A | 6/1987 | Adler et al. |
| 4,703,316 A | 10/1987 | Sherbeck |
| 4,710,760 A | 12/1987 | Kasday |
| 4,766,424 A | 8/1988 | Adler et al. |
| 4,811,004 A | 3/1989 | Person et al. |
| 4,851,664 A | 7/1989 | Rieger |
| 4,868,551 A | 9/1989 | Arditty et al. |
| 4,888,479 A | 12/1989 | Tamaru |
| 4,893,120 A | 1/1990 | Doering et al. |
| 4,916,308 A | 4/1990 | Meadows |
| 4,928,094 A | 5/1990 | Smith |
| 4,943,806 A | 7/1990 | Masters et al. |
| 4,990,901 A | 2/1991 | Beiswenger |
| 5,025,411 A | 6/1991 | Tallman et al. |
| 5,103,085 A | 4/1992 | Zimmerman |
| 5,105,186 A | 4/1992 | May |
| 5,140,647 A * | 8/1992 | Ise et al. .................. 382/284 |
| 5,148,015 A | 9/1992 | Dolan |
| 5,162,783 A | 11/1992 | Moreno |
| 5,164,714 A | 11/1992 | Wehrer |
| 5,179,369 A | 1/1993 | Person et al. |
| 5,196,836 A | 3/1993 | Williams |
| 5,239,152 A | 8/1993 | Caldwell et al. |
| 5,272,470 A | 12/1993 | Zetts |
| 5,422,494 A | 6/1995 | West et al. |
| 5,457,289 A | 10/1995 | Huang et al. |
| 5,581,378 A * | 12/1996 | Kulick et al. .................. 359/9 |
| 5,591,945 A | 1/1997 | Kent |
| 5,698,845 A | 12/1997 | Kodama et al. |
| 5,729,471 A * | 3/1998 | Jain et al. .................. 725/131 |
| 5,739,479 A | 4/1998 | Davis-Cannon |
| 5,771,039 A | 6/1998 | Ditzik |
| 5,784,054 A | 7/1998 | Armstrong et al. |
| 5,785,439 A | 7/1998 | Bowen |
| 5,786,810 A | 7/1998 | Knox et al. |
| 5,804,773 A | 9/1998 | Wilson et al. |
| 5,884,257 A * | 3/1999 | Maekawa et al. .................. 704/248 |
| 5,909,210 A | 6/1999 | Knox et al. |
| 5,940,065 A | 8/1999 | Babb et al. |
| 5,990,874 A | 11/1999 | Tsumura |
| 6,076,041 A | 6/2000 | Watanabe |
| 6,091,406 A | 7/2000 | Kambara et al. |
| 6,097,394 A * | 8/2000 | Levoy et al. .................. 345/419 |
| 6,215,477 B1 | 4/2001 | Morrison et al. |
| 6,226,004 B1 * | 5/2001 | Nishihara .................. 345/420 |
| 6,241,609 B1 * | 6/2001 | Rutgers .................. 463/31 |
| 6,304,263 B1 * | 10/2001 | Chiabrera et al. .................. 345/419 |
| 6,320,597 B1 | 11/2001 | Ieperen |
| 6,326,954 B1 | 12/2001 | Van Ieperen |
| 6,346,966 B1 | 2/2002 | Toh |
| 6,352,351 B1 | 3/2002 | Ogasahara et al. |
| 6,362,468 B1 | 3/2002 | Murakami et al. |
| 6,377,228 B1 | 4/2002 | Jenkin et al. |
| 6,384,743 B1 | 5/2002 | Vanderheiden |
| 6,429,857 B1 | 8/2002 | Masters et al. |
| 6,471,420 B1 * | 10/2002 | Maekawa et al. .................. 704/250 |
| 6,480,187 B1 | 11/2002 | Sano et al. |
| 6,504,532 B1 | 1/2003 | Ogasahara et al. |
| 6,532,006 B1 | 3/2003 | Takekawa et al. |
| 6,540,366 B2 | 4/2003 | Keenan et al. |
| 6,570,103 B1 | 5/2003 | Saka et al. |
| 6,590,568 B1 | 7/2003 | Astala et al. |
| 6,597,508 B2 | 7/2003 | Seino et al. |
| 6,603,867 B1 | 8/2003 | Sugino et al. |
| 6,624,833 B1 | 9/2003 | Kumar et al. |
| 6,650,318 B1 | 11/2003 | Arnon |
| 6,714,311 B2 | 3/2004 | Hashimoto |
| 6,720,949 B1 | 4/2004 | Pryor et al. |
| 6,738,051 B2 | 5/2004 | Boyd et al. |
| 6,803,906 B1 * | 10/2004 | Morrison et al. .................. 345/173 |
| 6,828,959 B2 | 12/2004 | Takekawa et al. |
| 6,919,880 B2 * | 7/2005 | Morrison et al. .................. 345/173 |
| 6,919,892 B1 * | 7/2005 | Cheiky et al. .................. 345/473 |
| 6,927,384 B2 | 8/2005 | Reime et al. |
| 7,002,555 B1 | 2/2006 | Jacobsen et al. |
| 7,058,204 B2 | 6/2006 | Hildreth et al. |
| 7,075,054 B2 | 7/2006 | Iwamoto et al. |
| 7,084,857 B2 | 8/2006 | Lieberman et al. |
| 7,151,533 B2 | 12/2006 | Van Iperen |
| 7,155,698 B1 * | 12/2006 | Gennari .................. 716/53 |
| 7,176,905 B2 * | 2/2007 | Baharav et al. .................. 345/175 |
| 7,227,526 B2 | 6/2007 | Hildreth et al. |
| 7,236,162 B2 | 6/2007 | Morrison et al. |
| 7,236,632 B2 * | 6/2007 | Erol et al. .................. 382/218 |
| 7,237,937 B2 | 7/2007 | Kawashima et al. |
| 7,242,388 B2 | 7/2007 | Lieberman et al. |
| 7,265,748 B2 | 9/2007 | Ryynanen |
| 7,268,692 B1 | 9/2007 | Lieberman |
| 7,271,795 B2 * | 9/2007 | Bradski .................. 345/158 |
| 7,283,126 B2 | 10/2007 | Leung |
| 7,283,128 B2 | 10/2007 | Sato |
| 7,289,113 B2 | 10/2007 | Martin |
| 7,302,156 B1 | 11/2007 | Lieberman et al. |
| 7,305,368 B2 | 12/2007 | Lieberman et al. |
| 7,330,184 B2 | 2/2008 | Leung |
| 7,333,094 B2 | 2/2008 | Lieberman et al. |
| 7,333,095 B1 | 2/2008 | Lieberman et al. |
| 7,372,456 B2 | 5/2008 | McLintock |
| 7,375,720 B2 | 5/2008 | Tanaka |
| RE40,368 E | 6/2008 | Arnon |
| 7,411,575 B2 | 8/2008 | Hill et al. |
| 7,479,949 B2 | 1/2009 | Jobs et al. |
| 7,492,357 B2 | 2/2009 | Morrison et al. |
| 7,499,037 B2 | 3/2009 | Lube |
| 7,538,759 B2 | 5/2009 | Newton |
| 7,559,664 B1 | 7/2009 | Walleman et al. |
| 8,089,462 B2 * | 1/2012 | Hill et al. .................. 345/163 |
| 8,358,872 B2 * | 1/2013 | Fujioka .................. 382/291 |
| 2001/0050677 A1 | 12/2001 | Tosaya |
| 2001/0055006 A1 | 12/2001 | Sano et al. |
| 2002/0008692 A1 | 1/2002 | Omura et al. |
| 2002/0015159 A1 | 2/2002 | Hashimoto |
| 2002/0041327 A1 | 4/2002 | Hildreth et al. |
| 2002/0064382 A1 | 5/2002 | Hildreth et al. |
| 2002/0118177 A1 | 8/2002 | Newton |
| 2002/0126116 A1 * | 9/2002 | Grzeszczuk et al. .................. 345/420 |
| 2003/0043116 A1 * | 3/2003 | Morrison et al. .................. 345/158 |
| 2003/0090473 A1 * | 5/2003 | Joshi .................. 345/173 |
| 2003/0137494 A1 | 7/2003 | Tulbert |
| 2003/0151562 A1 | 8/2003 | Kulas |
| 2003/0156118 A1 | 8/2003 | Ayinde |
| 2003/0161524 A1 | 8/2003 | King |
| 2003/0227492 A1 | 12/2003 | Wilde et al. |
| 2004/0001144 A1 | 1/2004 | McCharles et al. |
| 2004/0012573 A1 | 1/2004 | Morrison et al. |
| 2004/0032401 A1 | 2/2004 | Nakazawa et al. |
| 2004/0051709 A1 | 3/2004 | Ogawa et al. |
| 2004/0125086 A1 | 7/2004 | Hagermoser et al. |
| 2004/0160420 A1 * | 8/2004 | Baharav et al. .................. 345/173 |
| 2004/0196282 A1 * | 10/2004 | Oh .................. 345/419 |
| 2004/0201575 A1 | 10/2004 | Morrison |
| 2004/0202349 A1 * | 10/2004 | Erol et al. .................. 382/100 |
| 2004/0204129 A1 | 10/2004 | Payne et al. |
| 2004/0221265 A1 | 11/2004 | Leung et al. |
| 2005/0077452 A1 | 4/2005 | Morrison et al. |
| 2005/0104860 A1 | 5/2005 | McCreary et al. |
| 2005/0128190 A1 | 6/2005 | Ryynanen |
| 2005/0156900 A1 | 7/2005 | Hill et al. |
| 2005/0162402 A1 * | 7/2005 | Watanachote .................. 345/173 |

(56) References Cited

U.S. PATENT DOCUMENTS

| | | |
|---|---|---|
| 2005/0241929 A1 | 11/2005 | Auger et al. |
| 2005/0243070 A1 | 11/2005 | Ung et al. |
| 2005/0248539 A1 | 11/2005 | Morrison et al. |
| 2005/0248540 A1 | 11/2005 | Newton |
| 2005/0270781 A1 | 12/2005 | Marks |
| 2006/0012579 A1 | 1/2006 | Sato |
| 2006/0022962 A1 | 2/2006 | Morrison et al. |
| 2006/0028456 A1 | 2/2006 | Kang |
| 2006/0034486 A1 | 2/2006 | Morrison et al. |
| 2006/0152500 A1 | 7/2006 | Weng |
| 2006/0170658 A1 | 8/2006 | Nakamura et al. |
| 2006/0197749 A1 | 9/2006 | Popovich |
| 2006/0202953 A1* | 9/2006 | Pryor et al. ............... 345/156 |
| 2006/0244067 A1* | 11/2006 | Socher et al. ............ 257/350 |
| 2006/0244734 A1 | 11/2006 | Hill et al. |
| 2006/0274067 A1 | 12/2006 | Hidai |
| 2006/0279558 A1 | 12/2006 | Van Delden et al. |
| 2007/0002028 A1 | 1/2007 | Morrison et al. |
| 2007/0019103 A1 | 1/2007 | Lieberman et al. |
| 2007/0089915 A1 | 4/2007 | Ogawa et al. |
| 2007/0152984 A1 | 7/2007 | Ording et al. |
| 2007/0152986 A1 | 7/2007 | Ogawa et al. |
| 2007/0165007 A1 | 7/2007 | Morrison et al. |
| 2007/0205994 A1 | 9/2007 | van Ieperen |
| 2007/0273842 A1 | 11/2007 | Morrison |
| 2008/0029691 A1 | 2/2008 | Han |
| 2008/0042999 A1 | 2/2008 | Martin |
| 2008/0055262 A1 | 3/2008 | Wu et al. |
| 2008/0055267 A1 | 3/2008 | Wu et al. |
| 2008/0062140 A1 | 3/2008 | Hotelling et al. |
| 2008/0068352 A1 | 3/2008 | Worthington et al. |
| 2008/0083602 A1 | 4/2008 | Auger et al. |
| 2008/0106706 A1 | 5/2008 | Holmgren et al. |
| 2008/0259050 A1 | 10/2008 | Lin et al. |
| 2008/0259052 A1 | 10/2008 | Lin et al. |
| 2008/0284733 A1* | 11/2008 | Hill et al. ............... 345/163 |
| 2009/0058832 A1 | 3/2009 | Newton |
| 2009/0058833 A1 | 3/2009 | Newton |
| 2009/0146972 A1 | 6/2009 | Morrison et al. |

FOREIGN PATENT DOCUMENTS

| | | |
|---|---|---|
| CA | 2058219 A1 | 4/1993 |
| CA | 2367864 A1 | 4/1993 |
| CA | 2219886 A1 | 4/1999 |
| CA | 2251221 A1 | 4/1999 |
| CA | 2267733 A1 | 10/1999 |
| CA | 2268208 A1 | 10/1999 |
| CA | 2252302 A1 | 4/2000 |
| CA | 2350152 A1 | 6/2001 |
| CA | 2341918 A1 | 9/2002 |
| CA | 2386094 A1 | 12/2002 |
| CA | EP001262909 A2 * | 12/2002 |
| CA | 2372868 A1 | 8/2003 |
| CA | 2390503 A1 | 12/2003 |
| CA | 2390506 A1 | 12/2003 |
| CA | 2432770 A1 | 12/2003 |
| CA | 2448603 A1 | 5/2004 |
| CA | 2453873 A1 | 7/2004 |
| CA | 2460449 A1 | 9/2004 |
| CA | 2521418 A1 | 10/2004 |
| CA | 2481396 A1 | 3/2005 |
| CA | 2491582 A1 | 7/2005 |
| CA | 2563566 A1 | 11/2005 |
| CA | 2564262 A1 | 11/2005 |
| CA | 2501214 A1 | 9/2006 |
| CA | 2606863 A1 | 11/2006 |
| CA | 2580046 A1 | 9/2007 |
| CN | 1310126 C | 8/2001 |
| CN | 1784649 A | 6/2006 |
| CN | 101019096 A | 8/2007 |
| CN | 101023582 A | 8/2007 |
| CN | 1440539 A | 9/2009 |
| DE | 3836429 | 5/1990 |
| DE | 60124549 | 9/2007 |
| EP | 0125068 A2 | 11/1984 |
| EP | 0420335 | 4/1991 |
| EP | 0897161 A1 | 2/1999 |
| EP | 0911721 A2 | 4/1999 |
| EP | 1059605 A2 | 12/2000 |
| EP | 1262909 A2 | 12/2002 |
| EP | 1739528 A1 | 1/2003 |
| EP | 1739529 A1 | 1/2003 |
| EP | 1420335 A2 | 5/2004 |
| EP | 1457870 A2 | 9/2004 |
| EP | 1471459 A2 | 10/2004 |
| EP | 1517228 A2 | 3/2005 |
| EP | 1550940 A2 | 6/2005 |
| EP | 1611503 | 1/2006 |
| EP | 1674977 | 6/2006 |
| EP | 1741186 | 1/2007 |
| EP | 1766501 | 3/2007 |
| EP | 1830248 A1 | 9/2007 |
| EP | 1877893 | 1/2008 |
| ES | 2279823 T3 | 9/2007 |
| GB | 1575420 | 9/1980 |
| GB | 2176282 A | 5/1986 |
| GB | 2263765 A | 8/1993 |
| JP | 62-005428 | 1/1987 |
| JP | 63-223819 | 9/1988 |
| JP | 03-244017 | 10/1991 |
| JP | 06-110608 | 4/1994 |
| JP | 11-203042 | 7/1999 |
| JP | 11-212692 | 8/1999 |
| JP | 2001-142642 | 5/2001 |
| JP | 2002-055770 | 2/2002 |
| JP | 2003-36142 A | 2/2003 |
| JP | 2003-65716 A | 3/2003 |
| JP | 2005-108211 A | 4/2005 |
| JP | 2005-182423 A | 7/2005 |
| JP | 2005-202950 A | 7/2005 |
| WO | 01/24157 A1 | 4/2001 |
| WO | 01/63550 A2 | 8/2001 |
| WO | 01/91043 A2 | 11/2001 |
| WO | 02/03316 A1 | 1/2002 |
| WO | 03/104887 A2 | 12/2003 |
| WO | 2004/072843 A1 | 8/2004 |
| WO | 2004/090706 A2 | 10/2004 |
| WO | 2004/104810 A1 | 12/2004 |
| WO | 2005/031554 A1 | 4/2005 |
| WO | 2005034027 A1 | 4/2005 |
| WO | 2005/107072 A1 | 11/2005 |
| WO | 2006/002544 A1 | 1/2006 |
| WO | 2006/092058 A1 | 9/2006 |
| WO | 2006/095320 A2 | 9/2006 |
| WO | 2006/096962 A1 | 9/2006 |
| WO | 2006/116869 A1 | 11/2006 |
| WO | 2007/019600 A1 | 2/2007 |
| WO | 2007/037809 | 4/2007 |
| WO | 2007/079590 | 7/2007 |
| WO | 2007/132033 A1 | 11/2007 |
| WO | 2007/134456 A1 | 11/2007 |
| WO | 2008/128096 A2 | 10/2008 |
| WO | 2009/029764 A1 | 3/2009 |
| WO | 2009/029767 A1 | 3/2009 |
| WO | 2009/146544 A1 | 12/2009 |
| WO | 2010/0512633 A1 | 5/2010 |

OTHER PUBLICATIONS

"International Preliminary Report on Patentability", PCT/US2008/060102, Oct. 22, 2009 (9 pages).

International Search Report for PCT/CA2010/001085 mailed Oct. 12, 2010 (5 pages).

"International Application Serial No. PCT/US2008/060102, Search Report & Written opinion mailed Feb. 12, 2009" (14 pages).

International Application Serial No. PCT/US2008/074749, Search Report & Written Opinion mailed Feb. 11, 2009 (10 pages).

"International Application Serial No. PCT/US2008/074755, International Search Report and Written Opinion mailed Jan. 29, 2009" (14 pages).

International Search Report for PCT/NZ05/00092 Sep. 27, 2006 (4 pages).

(56) References Cited

OTHER PUBLICATIONS

Loinaz et al., "A 200-mW, 3.3-V, CMOS Color Camera IC Producing 352x288 24-B Video at 30 Frames/s," IEEE Journal of Solid-StateCircuits,vol. 31,No. 12,Dec. 1998, pp. 2092-2103.
Yawcheng Lo, "Solid-state image sensor: technologies and applications," Input/Output and Imaging Technologies, Y.T. Tsai, T-M. Kung, and J. Larsen, eds. SPIE Proceedings vol. 3422, pp. 70-80 (1998).
*Touch Panel*, vol. 5 No. 2-3 (Sep. 2010).
*Touch Panel*, vol. 5 No. 4 (Nov. 2010).
"Store Window Presentations", Heddier Electronic.
"ThruGlass", Projected Capacitive Touchscreencs Specifications, Micro Touch.
Benko, et al., "Precise Selection Techniques for Multi-Touch Screens", Proc. ACM CHI 2006: Human Factors in Computer Systems, pp. 1263-1272.
Buxton, W., "Issues and Techniques in Touch-Sensitive Tablet Input," Computer Graphics, 19(3), Proceedings of SIGGRAPH '85, 1985, pp. 215-223.
VGA-format CMOS Camera-on-a-Chip for Multimedia Applications, Photobit Corporation, 1999 (2 pages).
"White Paper", Digital Vision Touch Technology Feb. 2003.
Sep. 8, 2011 Office Action for Canadian Patent Application No. 2,491,582.
Rejection notice for Japanese Patent Application No. 2011-209880 with a mailing date of Feb. 5, 2013.

\* cited by examiner

PRIMARY TRIANGULATION PAIR: $C_1 + C_2$
CAMERA $C_3$ MAY SEE POINTER P
    $C_3$ MAY:    - IGNORE POINTER P (TOO FAR AWAY)
                 - PASSIVELY TRACK POINTER P
                 - ASSIST IN TRIANGULATION OF POINTER P
                   ($C_1 + C_3$, $C_2 + C_3$)

PRIMARY TRIANGULATION PAIRS: $C_1 + C_2$, $C_1 + C_3$, $C_2 + C_3$
CAMERA $C_4$ MAY SEE POINTER P
    $C_4$ MAY:     - IGNORE POINTER P (TOO FAR AWAY)
                     - PASSIVELY TRACK POINTER P
                     - ASSIST IN TRIANGULATION OF POINTER P
                       ($C_1 + C_4$, $C_2 + C_4$, $C_3 + C_4$)

PRIMARY TRIANGULATION PAIR: $C_2 + C_3$
CAMERAS $C_1$ AND $C_4$ MAY SEE POINTER P
    $C_1$ & $C_4$ MAY:    - IGNORE POINTER P (TOO FAR AWAY)
                          - PASSIVELY TRACK POINTER P
                          - ASSIST IN TRIANGULATION OF POINTER P
              $C_1 + C_2,\ C_1 + C_3,\ C_1 + C_4$
              $C_2 + C_3,\ C_2 + C_4$
              $C_3 + C_4$

POINTER TRACKING ACROSS MULTIPLE OVERLAPPING COORDINATE INPUT SUB-REGIONS DEFINING A GENERALLY CONTIGUOUS INPUT REGION

This application is a continuation application of U.S. patent application Ser. No. 12/098,961, filed Apr. 7, 2008, now U.S. Pat. No. 8,089,462, issued Jan. 3, 2012, which is a continuation application of U.S. patent application Ser. No. 10/750,219, filed Jan. 2, 2004, now U.S. Pat. No. 7,355,593, issued Apr. 8, 2008, the contents of which are incorporated herein by reference.

FIELD OF THE INVENTION

The present invention relates generally to interactive input systems and in particular to a system and method for tracking a pointer across multiple overlapping coordinate input sub-regions defining a generally contiguous input region and to an interactive touch system incorporating the same.

BACKGROUND OF THE INVENTION

Touch systems are well known in the art and typically include a touch screen having a touch surface on which contacts are made using a pointer in order to generate user input. Pointer contacts with the touch surface are detected and are used to generate corresponding output depending on areas of the touch surface where the contacts are made. Common touch systems utilize analog resistive, electromagnetic, capacitive, acoustic or machine vision to identify pointer contacts with the touch surface.

For example, International PCT Application No. PCT/CA01/00980 filed on Jul. 5, 2001 and published under No. WO 02/03316 on Jan. 10, 2002, assigned to SMART Technologies Inc., assignee of the present invention, discloses a camera-based touch system comprising a touch screen that includes a passive touch surface on which a computer-generated image is presented. A rectangular bezel or frame surrounds the touch surface and supports digital cameras at its corners. The digital cameras have overlapping fields of view that encompass and look across the touch surface. The digital cameras acquire images looking across the touch surface from different locations and generate image data. Image data acquired by the digital cameras is processed by digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y)-coordinates relative to the touch surface using triangulation. The pointer coordinate data is conveyed to a computer executing one or more applications programs. The computer uses the pointer coordinate data to update the computer-generated image that is presented on the touch surface. Pointer contacts on the touch surface can therefore be recorded as writing or drawing or used to control execution of applications programs executed by the computer.

Although the above touch system works extremely well, since the fields of view of the cameras are arranged to encompass the entire touch surface, camera resolution has placed a limit on the size of the touch system that can be made.

In many environments such as in teaching institutions, very large scale touch systems are desired so that visible presentations can be made to large groups. A very large scale touch system created from a series of side-by-side mounted touch panels has been considered. Although this touch system provides a larger touch surface, the touch surface is not continuous due to the individual frames surrounding the touch surfaces. Also, tracking pointer movements from one touch surface to another is cumbersome and user unfriendly. As will be appreciated, improvements in very large scale touch systems are desired.

It is therefore an object of the present invention to provide a system and method for tracking a pointer across multiple overlapping coordinate input sub-regions defining a generally contiguous input region and to an interactive touch system incorporating the same.

SUMMARY OF THE INVENTION

According to one aspect of the present invention there is provided in a pointer tracking system including at least two overlapping coordinate input sub-regions defining a generally contiguous input region, each coordinate input sub-region generating pointer coordinate data in response to pointer movement therein, a method for tracking a pointer across overlapping portions of said coordinate input sub-regions comprising:

detecting pointer movements within overlapping portions of said coordinate input sub-regions; and processing the pointer coordinate data generated by each of said coordinate input sub-regions as a result of pointer movement within said overlapping portions in accordance with defined logic to yield a single set of pointer coordinate data representing the pointer movement.

According to another aspect of the present invention there is provided in a touch system including a plurality of coordinate input sub-regions that overlap defining a generally contiguous input surface, each coordinate input sub-region generating pointer coordinate data in response to pointer contacts thereon, said pointer coordinate data being processed to update image data presented on said input surface, a method of detecting the position of a pointer contact relative to said touch surface comprising:

acquiring overlapping images of each coordinate input sub-region;

when a pointer contact is made on a portion of a coordinate input sub-region that does not overlap with an adjacent coordinate input sub-region, processing acquired images to derive pointer data and triangulating the position of the pointer using the derived pointer data thereby to determine the position of the pointer contact relative to the touch surface; and when a pointer contact is made on a portion of a coordinate input sub-region that overlaps with an adjacent coordinate input sub-region, for each coordinate input sub-region processing acquired images to derive pointer data, and triangulating positions of the pointer using the derived pointer data, and thereafter processing the triangulated positions in accordance with defined logic thereby to determine the position of the pointer contact relative to the touch surface.

According to yet another aspect of the present invention there is provided a touch system comprising:

a plurality of coordinate input sub-regions, said input sub-regions overlapping to define a generally contiguous input surface, each coordinate input sub-region acquiring overlapping images thereof and generating pointer coordinate data in response to pointer contacts thereon, said pointer coordinate data being processed to update image data presented on said input surface, wherein:

when a pointer contact is made on a portion of a coordinate input sub-region that does not overlap with an adjacent coordinate input sub-region, said coordinate input sub-region processes acquired images to derive pointer data and triangulates the position of the pointer using the derived pointer data thereby to determine the position of the pointer contact relative to the touch surface; and when a pointer contact is made on a portion of a coordinate input sub-region that overlaps with an adjacent coordinate input sub-region, each overlapping coordinate input sub-region processes acquired images to derive pointer data and triangulates the position of the pointer using the derived pointer data, the triangulated positions generated by the overlapping coordinate input sub-regions being processed in accordance with defined logic thereby to determine the position of the pointer contact relative to the touch surface.

The present invention provides advantages in that pointer contacts over an input region defined by multiple overlapping coordinate input sub-regions can be tracked effectively in a user friendly manner. Also, since a transition zone is provided between adjacent overlapping coordinate input sub-regions, coordinate input events can be transferred smoothly between coordinate input sub-regions. The transition zone also increases alignment tolerances between adjacent coordinate input sub-regions.

BRIEF DESCRIPTION OF THE DRAWINGS

Embodiments of the present invention will now be described more fully with reference to the accompanying drawings in which.

DETAILED DESCRIPTION OF THE EMBODIMENTS

Figure 1:
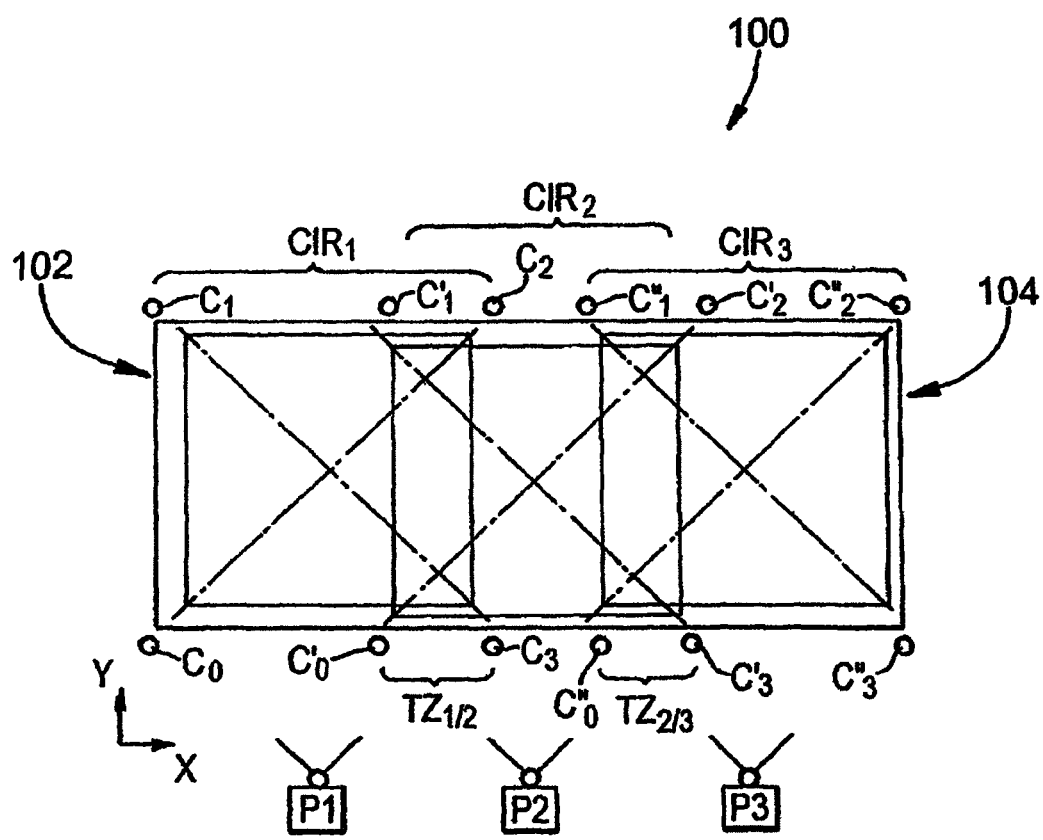
FIG. 1 is a front plan view of a very large scale touch system in accordance with the present invention including an elongate rectangular, generally contiguous touch surface divided into a series of coordinate input sub-regions.
Figure 2:
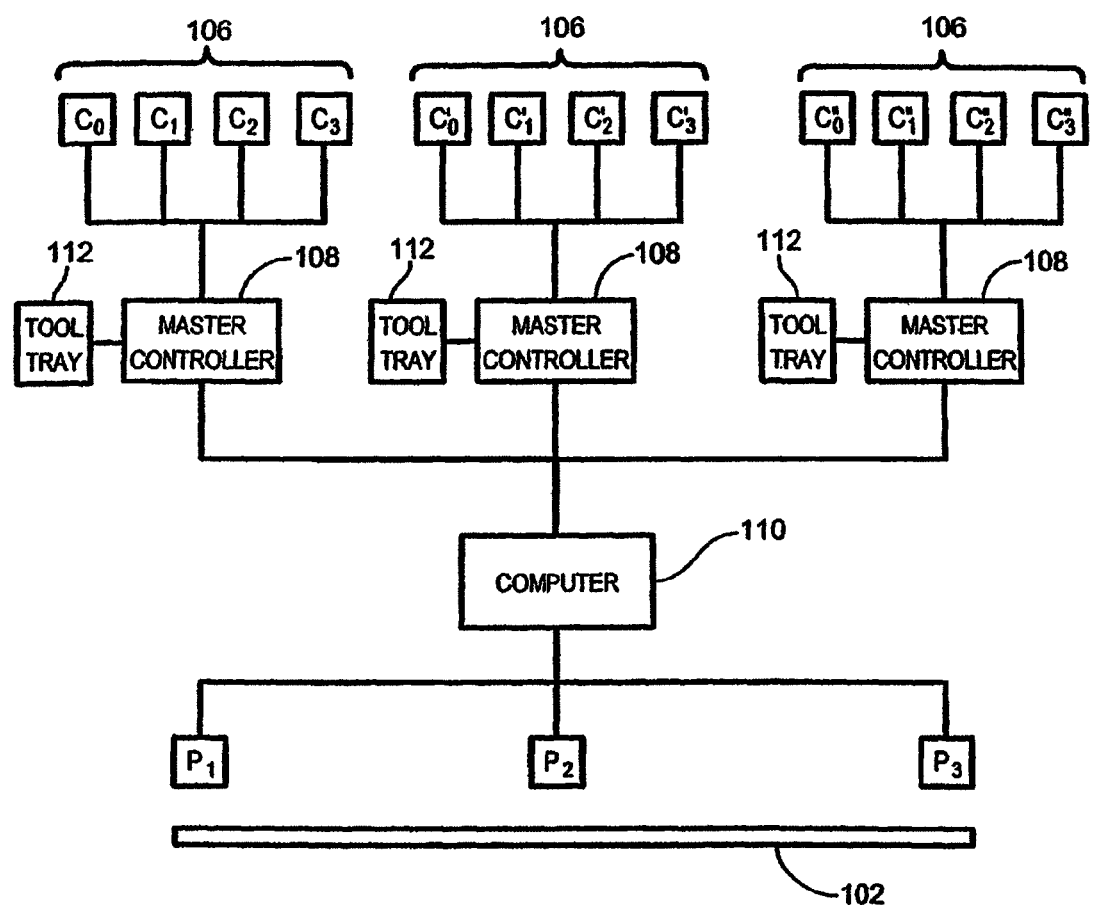
FIG. 2 is a schematic block diagram of the touch system of FIG. 1.

Turning now to FIGS. 1 and 2, a very large scale interactive touch system in accordance with the present invention is shown and is generally identified by reference numeral 100. Touch system 100 includes an elongate generally rectangular and contiguous touch surface 102 surrounded by an illuminated bezel 104. Illuminated bezel 104 provides infrared backlighting across the touch surface 102 and is of the type described in U.S. patent application Ser. No. 10/354,168 to Akitt et al. filed on Jan. 30, 2002, assigned to SMART Technologies, Inc., assignee of the present invention, the content of which is incorporated herein by reference.

A plurality of sets 106 of cameras, in this example three sets 106 of cameras, is associated with the touch surface 102. The sets 106 of cameras are positioned along the length of the touch surface 102. Each set 106 of cameras includes four cameras arranged to define the corners of a rectangle. The cameras of each set 106 have overlapping fields of view oriented to look across a portion of the touch surface 102 thereby to define a touch or coordinate input sub-region. Thus, in the present embodiment, the sets 106 of cameras define a series of three side-by-side coordinate input sub-regions $CIR_1$, $CIR_2$ and $CIR_3$ respectively. The fields of view of the cameras are also oriented so that the coordinate input sub-regions defined by adjacent sets of cameras overlap to define two transition zones $TZ_{1/2}$ and $TZ_{2/3}$ respectively.

Each set 106 of cameras communicates with a master controller 108. Each master controller 108 processes pointer characteristic data received from its associated set 106 of cameras to determine the positions of pointers appearing in images captured by the cameras in (x,y)-coordinates using triangulation. The master controllers 108 transmit the pointer coordinate data to a computer 110 allowing the computer 110 either to record the pointer coordinate data as writing or drawing or use the pointer coordinate data as a mouse event to control execution of an applications program executed by the computer 110. The computer 110 provides image data to a series of projectors $P_1$ to $P_3$, which in turn project images onto the touch surface 102. The image data is updated by the computer 110 in response to received pointer coordinate data so that the images projected onto the touch surface 102 reflect the pointer activity.

Each projector is associated with a different coordinate input sub-region and projects an image thereon. As can be seen, projector $P_1$ projects an image $I_1$ onto coordinate input sub-region $CIR_1$, projector $P_2$ projects an image $I_2$ onto coordinate input sub-region $CIR_2$ and projector $P_3$ projects an image $I_3$ onto coordinate input sub-region $CIR_3$. The projected images $I_1$, $I_2$ and $I_3$ are aligned and joined seamlessly along vertical lines generally at the mid-points of the transition zones $TZ_{1/2}$ and $TZ_{2/3}$ to provide a smooth and continuous image spanning the touch surface 102. In the present embodiment, the computer 110 executes a desktop application. Each coordinate input sub-region is associated with and tied to a specific section of the desktop during an orientation procedure as will be described. As a result, the computer 110 provides image data to the projectors $P_1$ to $P_3$ so that the appropriate desktop sections are displayed on the coordinate input sub-regions.

A tool tray 112 is also associated with each coordinate input sub-region. Each tool tray 112 holds a number of pointers or tools (not shown) having different assigned attributes. In this case, each tool tray holds a number of colored pens as well as an eraser. When a tool is lifted from the tool tray, the tool tray provides a signal to the associated master controller 108 which in turn conveys the signal to the computer 110 to identify the selected tool. In this manner, when a colored pen is used to contact the touch surface 102 writing in the appropriate color tracking the pen movement is projected onto the touch surface. When an eraser is used to contact the touch surface 102 writing projected onto the touch surface over which the eraser is moved is erased. As is known, the desktop application can be conditioned to assign properties to pointers used to contact each coordinate input sub-region.

Figure 3A:
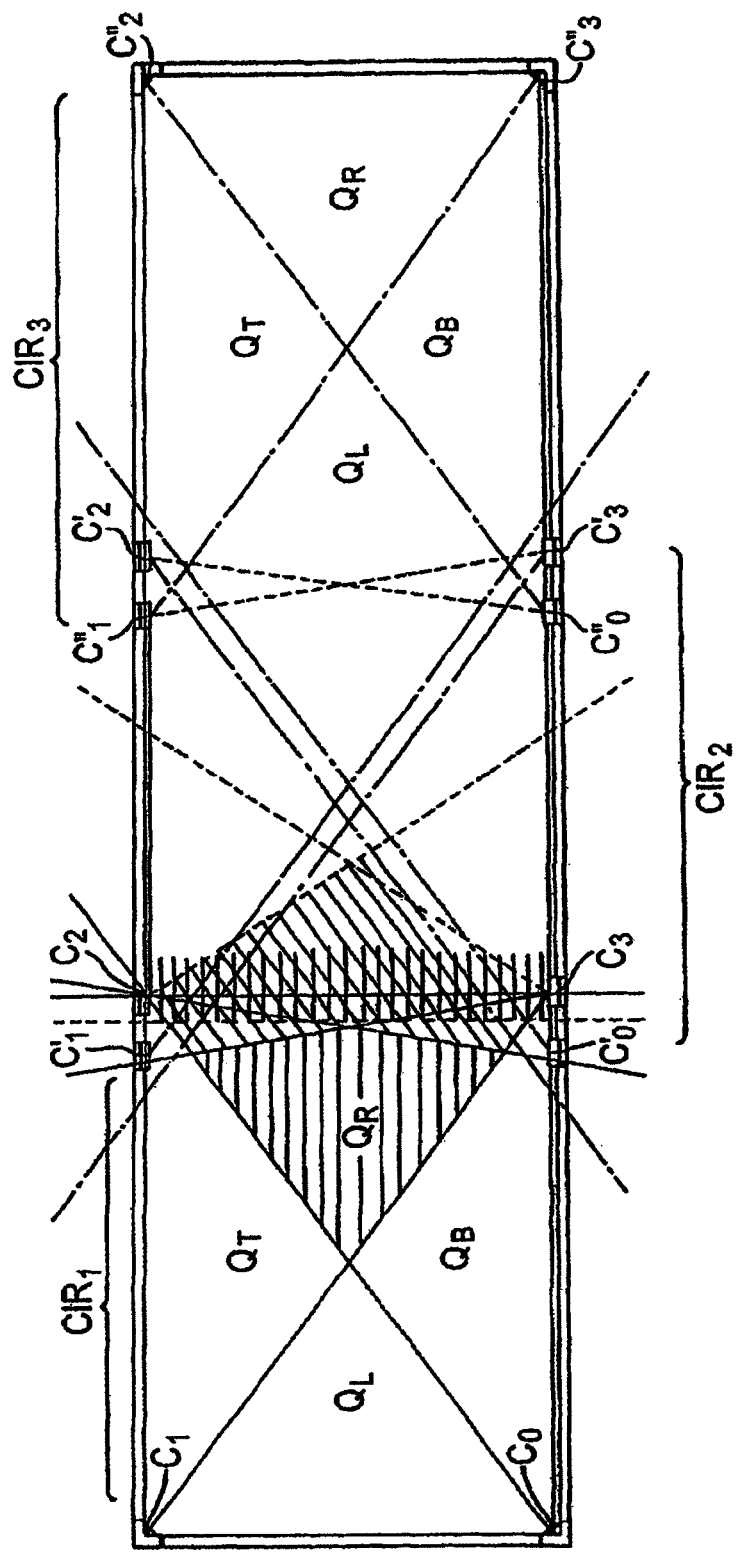
FIGS. 3a and 3b are front plan views of the touch surface showing the positions and orientations of cameras used to capture overlapping images looking across the touch surface.
Figure 3B:
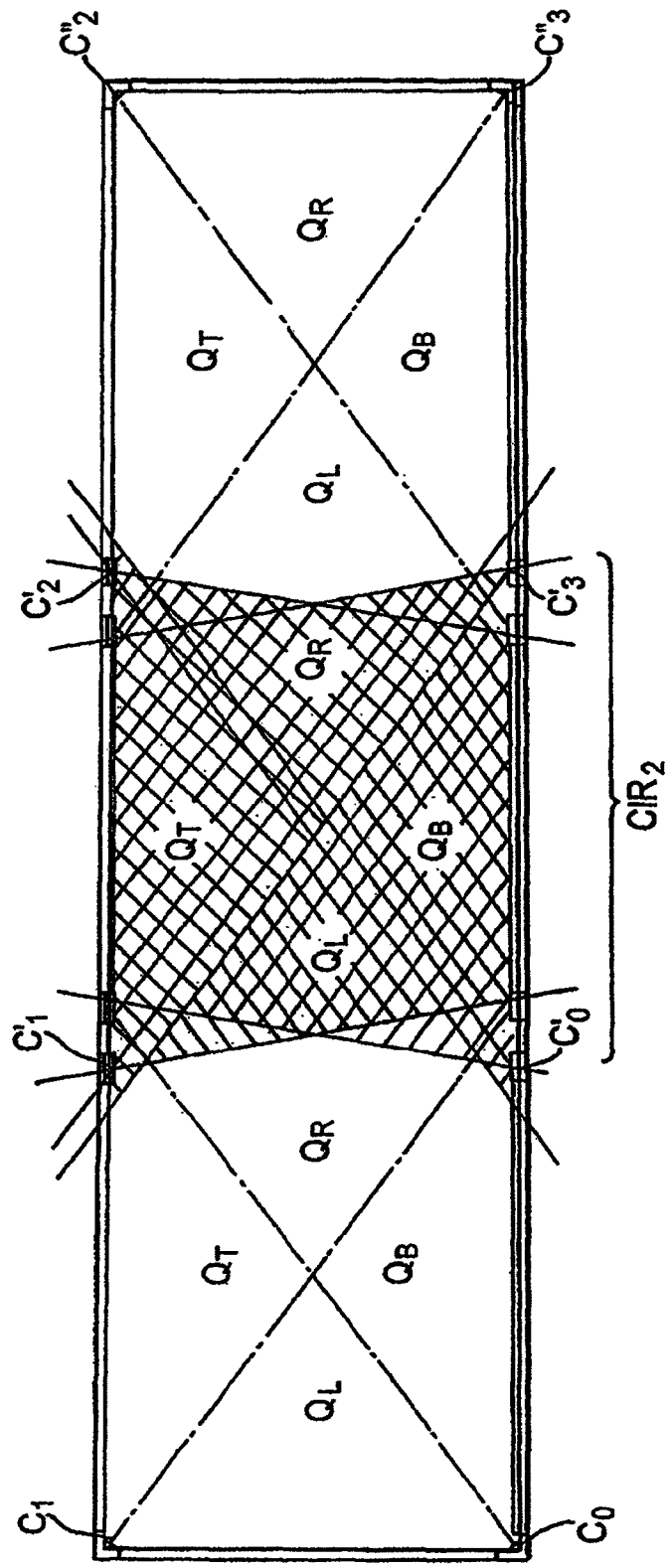

Turning now to FIGS. 1, 3a and 3b, the positions and the orientations of the cameras in the sets 106 will be further described. The set 106 of cameras associated with coordinate input sub-region $CIR_1$ includes cameras $C_1$ and $C_0$ positioned at the top left and bottom left corners of the touch surface 102 and cameras $C_2$ and $C_3$ positioned at the top and bottom of the touch surface 102 intermediate its length. The camera $C_1$ is oriented so that its optical axis is aimed generally towards the intermediate camera $C_3$ and forms a 45 degree angle with respect to the vertical. The camera $C_0$ is oriented so that its optical axis is aimed at generally towards intermediate camera $C_2$ and forms a 45 degree angle with respect to the vertical. The intermediate camera $C_2$ is oriented so that an edge of its field of view is aimed slightly towards camera $C_0$ and forms a 10 degree angle with respect to the vertical. The intermediate camera $C_3$ is oriented so that an edge of its field of view is aimed slightly towards camera $C_1$ and forms a 10 degree angle with respect to the vertical.

The set 106 of cameras associated with coordinate input sub-region $CIR_3$ includes cameras $C_2''$ and $C_3''$ positioned at the top right and bottom right corners of the touch surface 102 and cameras $C_1''$ and $C_0''$ positioned at the top and bottom of the touch surface 102 intermediate its length. The camera $C_2''$ is oriented so that its optical axis is aimed generally towards the intermediate camera $C_0''$ and forms a 45 degree angle with respect to the vertical. The camera $C_3''$ is oriented so that its optical axis is aimed generally towards the intermediate camera $C_1''$ and forms a 45 degree angle with respect to the vertical. The intermediate camera $C_1''$ is oriented so that an edge of its field of view is aimed slightly towards camera $C_3''$ and forms a 10 degree angle with respect to the vertical. The intermediate camera $C_0''$ is oriented so that an edge of its field of view is aimed slightly towards camera $C_2''$ and forms a 10 degree angle with respect to the vertical.

The set 106 of cameras associated with the coordinate input sub-region $CIR_2$ includes laterally spaced cameras $C_1'$ and $C_2'$ positioned along the top of the touch surface 102 and laterally spaced cameras $C_0'$ and $C_3'$ positioned along the bottom of the touch surface 102. The top left camera $C_1'$ is located between cameras $C_1$ and $C_2$ and is oriented so that an edge of its field of view is aimed slightly towards camera $C_3'$ and forms a 10 degree angle with respect to the vertical. The top right camera $C_2'$ is located between cameras $C_1''$ and $C_2''$ and is oriented so that an edge of its field of view is aimed slightly towards camera $C_0'$ and forms a 10 degree angle with respect to the vertical. The bottom left camera $C_0'$ is located between cameras $C_0$ and $C_3$ and is oriented so that an edge of its field of view is aimed slightly towards camera $C_2'$ and forms a 10 degree angle with respect to the vertical. The bottom right camera $C_3'$ is located between cameras $C_0''$ and $C_3''$ and is oriented so that an edge of its field of view is aimed slightly towards the camera $C_1'$ and forms a 10 degree angle with respect to the vertical.

Figure 4A:
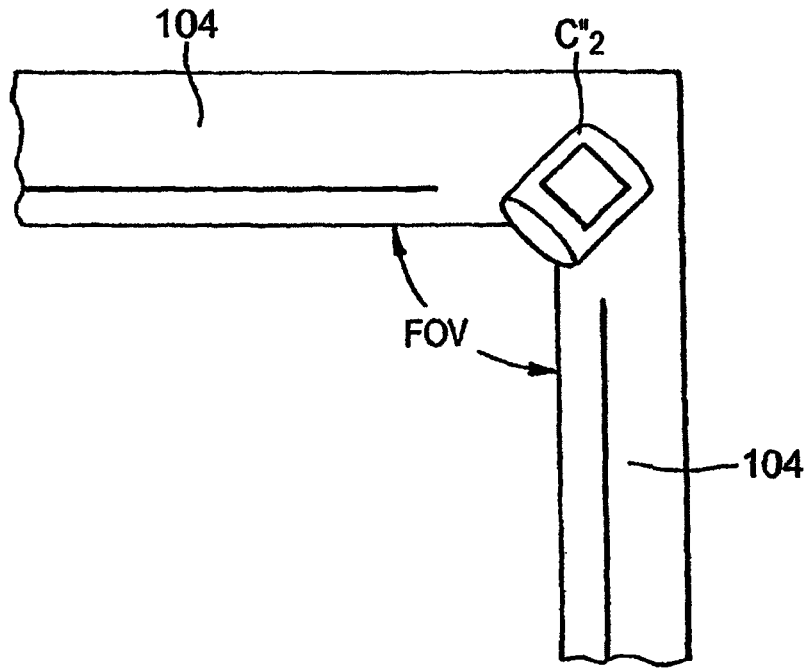
FIGS. 4a and 4b are front plan views of portions of an illuminated bezel surrounding the touch surface.
Figure 4B:
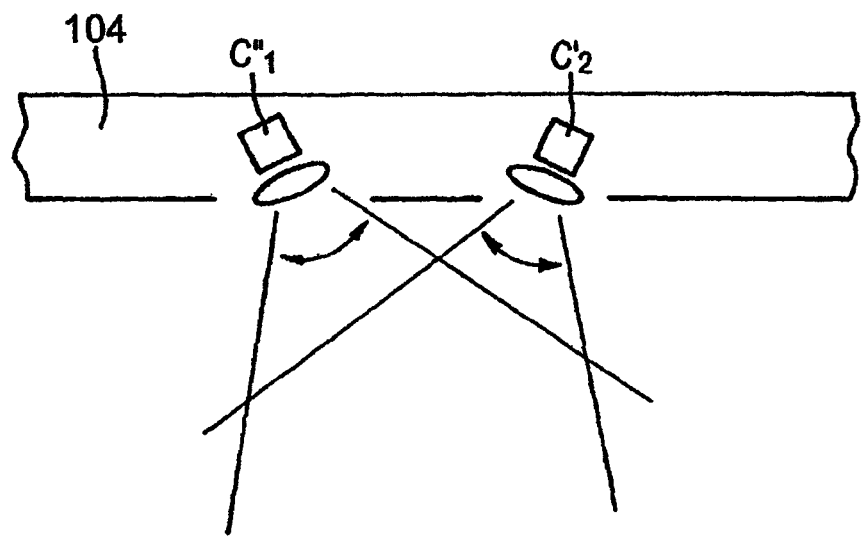

The cameras at the corners and along the top and bottom of the touch surface 102 are accommodated by the illuminated bezel 104 as shown in FIGS. 4a and 4b. Each camera is of the type disclosed in U.S. patent application Ser. No. 10/384,796 to Morrison et al. filed on Mar. 11, 2003, assigned to SMART Technologies Inc, assignee of the present invention, the content of which is incorporated herein by reference. Each camera has a field of view slightly greater than 90° and is operable to capture images looking across the touch surface 102 at a very high frame rate. Images captured by each camera are processed on-board to determine if a pointer exists in the captured images. If a pointer exists in an image captured by a camera, pointer characteristic data is generated by the camera and is conveyed to the associated master controller 108. When the master controller 108 receives pointer characteristic data from a pair of cameras having overlapping fields of view, the master controller triangulates the pointer characteristic data to calculate the position of the pointer in (x,y)-coordinates.

Each coordinate input sub-region is divided into four quadrants using diagonal lines extending between the cameras at opposite corners of the coordinate input sub-region. Image capture to permit pointer tracking within each quadrant is the responsibility of a different pair of cameras in the set. The top quadrant $Q_T$ is the responsibility of the bottom left and bottom right cameras in the set, the bottom quadrant $Q_B$ is the responsibility of the top left and top right cameras in the set, the left quadrant $Q_L$ is the responsibility of the top left and bottom left cameras in the set and the right quadrant $Q_R$ is the responsibility of the top right and bottom right cameras in the set.

Since each camera is only responsible for capturing images looking across two quadrants of the coordinate input sub-region, the field of view of each camera need only cover one half of the coordinate input sub-region. Using cameras with fields of view extending well beyond this requirement provides great flexibility with respect to orienting the cameras. For example, by tilting the intermediate cameras so that edges of their fields of view form 10° angles with respect to the vertical, the cameras provide coverage over the entire touch surface 102 while maintaining a 4:3 ratio and without requiring the cameras to intrude onto the touch surface thereby avoiding blind spots being created by the cameras. As will be appreciated, if the intermediate cameras intrude over the touch surface 102, they will block each others' view of portions of the touch surface. Also, by arranging the intermediate cameras so that edges of their fields of view form small angles with respect to the vertical, infrared lighting can be provided at the cameras that is generally in line with the infrared lighting provided by the illuminated bezels 104. This avoids dark spots from being introduced along the top and bottom of the touch surface at the intermediate camera locations.

The general operation of the touch system 100 will now be described. Initially an orientation procedure is performed by the computer 110 to calibrate the touch system 100 so that the coordinate systems of the coordinate input sub-regions can be mapped to the display coordinate systems and so that the overlapping portions of the coordinate input sub-regions within the transition zones can be mapped to one another.

With the touch system 100 calibrated, when a pointer contacts a quadrant within one of the coordinate input sub-regions outside of a transition zone, the images captured by the pair of cameras assigned to that quadrant are processed by the cameras and the associated master controller 108 in the manner described in U.S. patent application Ser. No. 10/294,917 to Morrison et al., assigned to SMART Technologies Inc., assignee of the present invention, the content of which is incorporated by reference. In this manner, a bounding box surrounding the pointer contact is determined allowing the location of the pointer in (x,y)-coordinates with respect to the coordinate input sub-region to be calculated. Thus, in this case only one master controller 108 reports pointer coordinate data to the computer 110. The computer 110 in turn records the pointer coordinate data as writing or drawing if the pointer contact is a write event or injects the pointer coordinate data into the active applications program being run by the computer 110 if the pointer contact is a mouse event.

In general to determine if a pointer contact is a write or mouse event, the tool type and point of first contact is examined. If a drawing tool is used to make the contact and the contact is within a designated writing area within the projected desktop section, the pointer contact is treated as a write event; otherwise the pointer contact is treated as a mouse event. At initial contact, the pointer is given a pointer identification (ID) and the pointer ID along with any assigned pointer attributes (i.e. shape, color, width etc.) are stored.

When a pointer contacts the touch surface 102 within a transition zone, the master controllers 108 associated with the two sets of cameras that observe the transition zone generate pointer coordinates in the same manner referenced above and convey the generated pointer coordinates to the computer 110. Upon receipt of the two reported pointer coordinates, the computer 110 uses defined logic, in this case a weighted averaging technique, to yield a single (x,y)-coordinate pair representing the position of the pointer contact. The computer 110 in turn records the pointer coordinate data as writing or drawing if the pointer contact is a write event or injects the pointer coordinate data into the active applications program being run by the computer 110 if the pointer contact is a mouse event.

By using a weighted averaging technique to determine pointer positions within the transition zones, a smooth pointer transition is achieved as a pointer is moved from one coordinate input sub-region to an adjacent coordinate input sub-region. When a pointer moves from one coordinate input sub-region to an adjacent coordinate input sub-region, since the attributes assigned to the pointer are stored with the pointer ID, the attributes of the pointer are maintained by the computer 110. Alternatively, when a pointer moves from one coordinate input sub-region to an adjacent coordinate input sub-region, the properties of the pointer can be changed to properties established by the desktop section associated with the new coordinate input sub-region after a pointer-up event or a certain period of pointer inactivity occurs.

Figure 5:
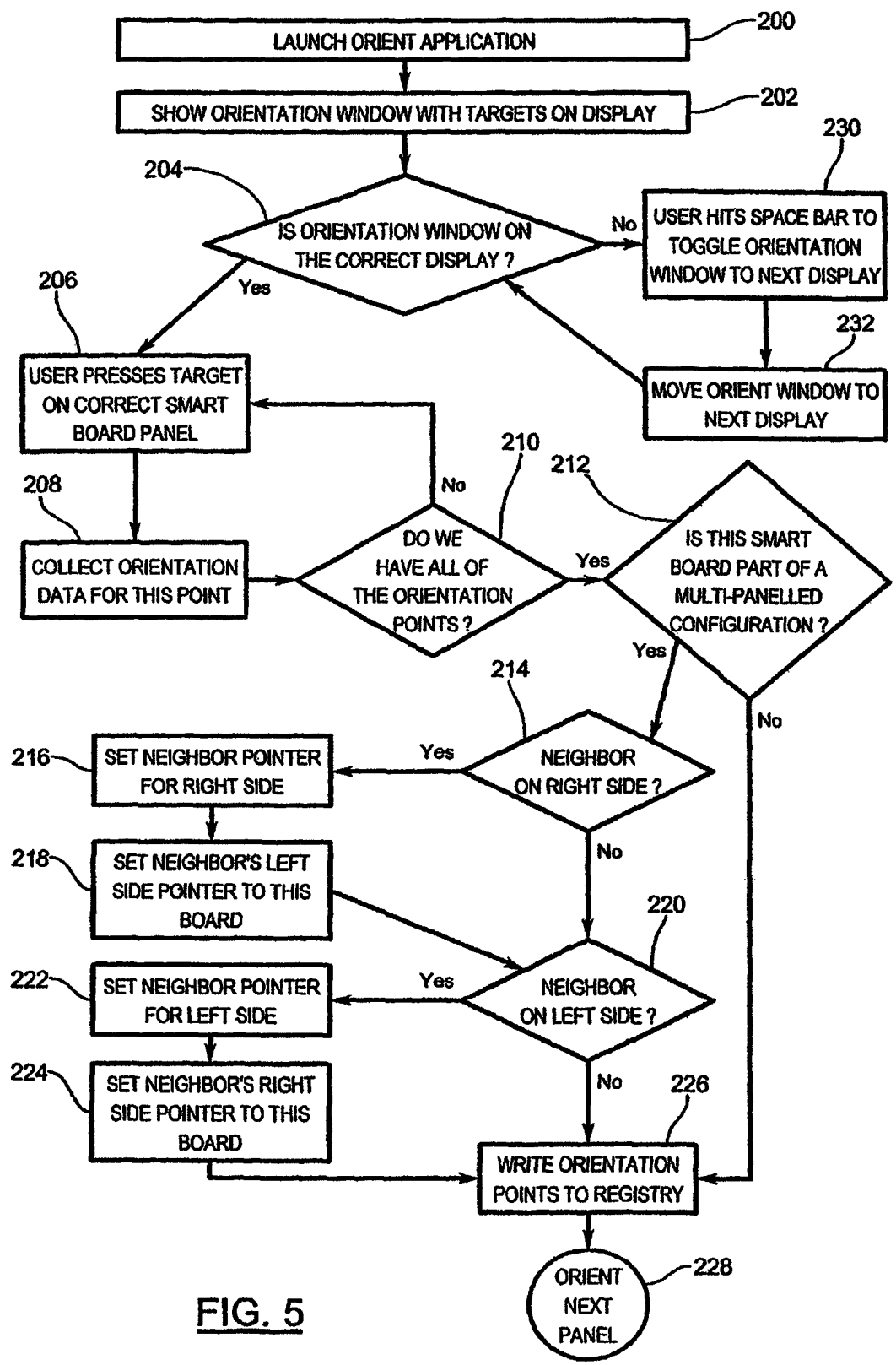
FIG. 5 is a flow chart showing the steps performed during orientation of the coordinate input sub-regions.
Figure 6:
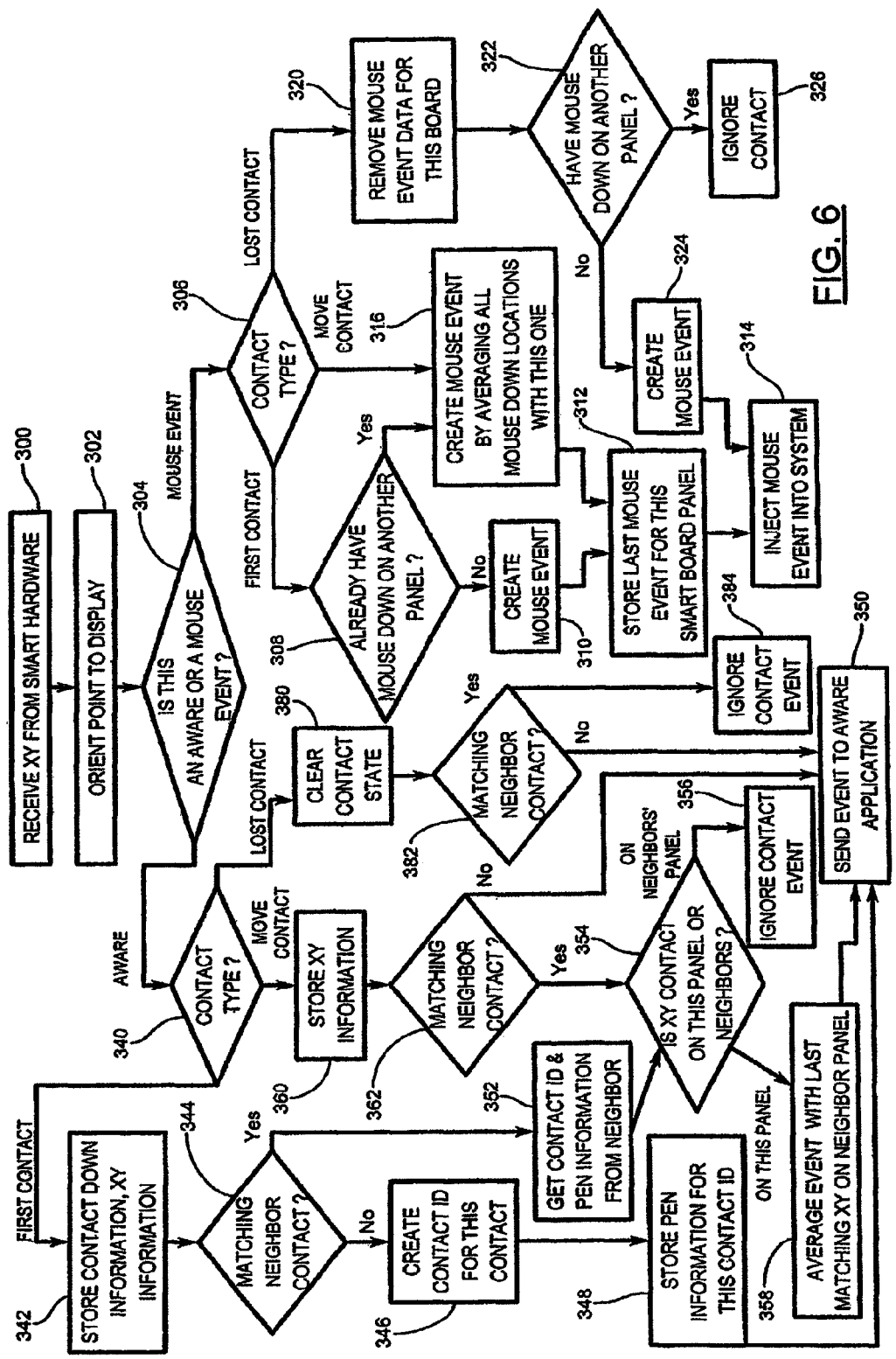
FIG. 6 is a flow chart showing the steps performed during handling of pointer contacts on the touch surface.

Further specifics of the orientation procedure and pointer tracking will now be described with reference to FIGS. 5 and 6.

Orientation Procedure

The orientation procedure performed by the computer 110 is similar to that described in U.S. Pat. No. 5,448,263 to Martin, assigned to SMART Technologies, Inc., assignee of the present invention. Turning now to FIG. 5, the steps performed by the computer 110 during orientation are shown. When the orientation procedure is launched (step 200), an orientation desktop section with targets is projected by one of the projectors onto its associated coordinate input sub-region (step 202). If the orientation desktop section is presented on the correct coordinate input sub-region, the desktop section is tied to the coordinate input sub-region and the user is prompted to contact the coordinate input sub-region at the target locations using a pointer (step 204 and 206). The pointer coordinate data generated as a result of each contact is collected allowing the coordinate system of the coordinate input sub-region to be mapped to the display coordinate system (step 208). When pointer coordinate data for each of the targets has been generated (step 210), the computer 110 checks to determine if the appropriate flag has been set to signify that the coordinate input sub-region is part of a multiple overlapping coordinate input sub-region configuration (step 212).

If the coordinate input sub-region is part of a multiple overlapping coordinate input sub-region configuration, the computer 110 checks to determine whether an oriented coordinate input sub-region exists to the right of the coordinate input sub-region being oriented on which the desktop section is displayed (step 214). If such an oriented coordinate input sub-region exists, the object representing the coordinate input sub-region being oriented is updated to include the address of the right neighbour coordinate input sub-region (step 216). The computer 110 then updates the object representing the right neighbour coordinate input sub-region to include the address of the coordinate input sub-region currently being oriented i.e. its left neighbour (step 218).

Upon completion of step 218 or if an oriented coordinate input sub-region does not exist to the right as determined at step 214, the computer 110 checks to determine whether an oriented coordinate input sub-region exists to the left of the coordinate input sub-region being oriented on which the desktop section is displayed (step 220). If such an oriented coordinate input sub-region exists, the object representing the coordinate input sub-region being oriented is updated to include the address of the left coordinate input sub-region (step 222). The computer 110 then updates the object representing the left neighbour coordinate input sub-region to include the address of the coordinate input sub-region currently being oriented i.e. its right neighbour (step 224).

Upon completion of step 224 or if an oriented coordinate input sub-region does not exist to the left as determined at step 220 or if the coordinate input sub-region is not part of a multiple overlapping coordinate input sub-region configuration as determined at step 212, the pointer coordinate data determined at step 208 is stored to registry (step 226). If the orientation procedure has not been performed with respect to the other coordinate input sub-regions, another section of the desktop with targets is presented on an adjacent coordinate input sub-region and the orientation procedure reverts to step 204 (step 228). If the orientation procedure has been performed with respect to the other coordinate input sub-regions or if the coordinate input sub-region is not part of a multiple overlapping coordinate input sub-region configuration as determined at step 212, the orientation procedure is exited.

At step 204, if the desktop section is not displayed on the proper coordinate input sub-region, the desktop section can be moved to the next coordinate input sub-region by hitting the space bar (step 230). When the space bar is hit, the computer 110 provides the output image data to the next projector so that the desktop section is presented on the adjacent coordinate input sub-region (step 232).

The pointer coordinate data stored in the registry at step 226 allows pointer contacts over the entire touch surface 102 to be mapped to the display coordinates and register the overlapping portions of the coordinate input sub-regions.

Pointer Tracking

When pointer coordinate data is output by a master controller 108 in response to a pointer contact on the associated coordinate input sub-region, the pointer coordinate data is conveyed to the computer 110 (step 300). In response, the computer 110 orients the pointer coordinate data to the display coordinates using the results of the orientation procedure (step 302) and then examines the pointer coordinate data to determine whether the pointer contact represents a mouse event or a write event (step 304). If the pointer contact represents a mouse event, the mouse event is examined to determine its type (step 306). If the mouse event represents a first contact with the coordinate input sub-region, a check is made to determine whether a mouse down event exists on another coordinate input sub-region within a transition zone shared by the coordinate input sub-regions (step 308). If such a mouse down event does not exist on another coordinate input sub-region, a mouse event is created (step 310) and the created mouse event for the coordinate input sub-region is stored (step 312). The stored mouse event is then injected into the active application running on the computer 110 (step 314). At step 308, if such a mouse down event exists, a new mouse event is created by averaging the locations of all mouse down events with the location of the current mouse event (step 316). The created new mouse event similarly is stored (step 312) and is then injected into the active application running on the computer 110 (step 314).

At step 306 if the mouse event represents a move contact within the coordinate input sub-region, a new mouse event is created by averaging the locations of all mouse down events with the location of the current mouse event (step 316). The created new mouse event similarly is stored (step 312) and is then injected into the active application running on the computer 110 (step 314).

At step 306, if the mouse event represents a remove contact from the coordinate input sub-region, the mouse data associated with the coordinate input sub-region is removed (step 320). A check is then made to determine if a mouse down event exists on another coordinate input sub-region (step 322). If not a remove mouse event is created (step 324) and the created remove mouse event is injected into the active application running on the computer 110 (step 314). If a mouse down condition exists on another coordinate input sub-region, the mouse event is ignored (step 326).

At step 304, if the pointer contact on the coordinate input sub-region represents a write event, the write event is examined to determine its type (step 340). If the write event represents a first contact with the coordinate input sub-region, contact down information together with the pointer (x,y)-coordinate data is stored (step 342). A check is then made to determine whether the stored information matches a pointer contact on a neighbour coordinate input sub-region (step 344). If the stored information does not match a pointer contact on a neighbour coordinate input sub-region, contact identification for the write event is created (step 346). Pointer information for the contact identification is stored (step 348). The pointer (x,y)-coordinate data in turn is recorded by the computer 110 as writing or drawing (step 350).

At step 344, if the stored information matches a pointer contact on a neighbour coordinate input sub-region signifying a pointer contact in a transition zone, contact identification and pointer information from the neighbour coordinate input sub-region is obtained (step 352). A check is then made to determine whether the pointer contact was made on the projected desktop section associated with the current coordinate input sub-region or on the projected desktop section associated with the neighbour coordinate input sub-region (step 354). If the pointer contact was made using a pointer the neighbour coordinate input sub-region, the pointer coordinate data is ignored (step 356) since the recorded pointer (x,y)-coordinate data will be processed by the neighbour coordinate input sub-region. Otherwise, the pointer coordinate data is averaged with the pointer (x,y)-coordinate data recorded by the neighbour coordinate input sub-region (step 358) prior to being recorded by the computer 110 as writing or drawing (step 350).

During averaging of the pointer coordinate data, the computer 110 processes the reported y coordinates in accordance with defined logic to yield a single y-coordinate. Specifically, the computer 110 calculates the y-coordinate using a weighted averaging technique. The weighted averaging technique used by the computer 110 to calculate the y-coordinate from the pair of reported y-coordinates is in accordance with the following rule assuming that the pointer enters the transition zone from coordinate input sub-region $CIR_x$ and is travelling in a direction towards coordinate input sub-region $CIR_{x+1}$:

$$y\text{-coordinate} = (100-P\%)*y\text{-coordinate of } CIR_x + P\%*y\text{-coordinate of } CIR_{x+1}$$

where:

P % is the distance travelled through the transition zone in the x-direction expressed a percentage.

As will be appreciated in this case at the first transition border i.e. the border between the coordinate input sub-region $CIR_x$ and the transition zone, the y-coordinate is equal to the y-coordinate reported by the master controller 108 associated with coordinate input sub-region $CIR_x$. At the second transition border i.e. the border between the transition zone and the coordinate input sub-region $CIR_{x+1}$, the y-coordinate is equal to the y-coordinate reported by the master controller 108 associated with coordinate input sub-region $CIR_{x+1}$. At the midpoint of the transition zone, the y-coordinate is equal to the average of the y-coordinates reported by the master controllers associated with the coordinate input sub-regions $CIR_x$ and $CIR_{x+1}$.

At step 340, if the write event represents a move contact over the coordinate input sub-region, the pointer (x,y)-coordinate data is stored (step 360). A check is then made to determine if the pointer (x,y)-coordinate data matches pointer (x,y)-coordinate data generated by a neighbour coordinate input sub-region (step 362). If the pointer (x,y)-coordinate data does not match pointer (x,y)-coordinate data generated by a neighbour coordinate input sub-region, the pointer (x,y)-coordinate data is recorded by the computer 110 as writing or drawing (step 350). If the pointer (x,y)-coordinate data matches pointer (x,y)-coordinate data generated by a neighbour coordinate input sub-region, a check is made to determine whether the pointer contact was made on the projected desktop section associated with the current coordinate input sub-region or on the projected desktop section associated with the neighbour coordinate input sub-region (step 354). If the pointer contact was made on the neighbour coordinate input sub-region, the pointer coordinate data is ignored (step 356) since the recorded pointer (x,y)-coordinate data will be processed by the neighbour coordinate input sub-region. Otherwise, the pointer coordinate data is averaged with the pointer (x,y)-coordinate data recorded by the neighbour coordinate input sub-region in the manner previously described (step 358) prior to being recorded by the computer 110 as writing or drawing (step 350).

At step 340, if the write event represents a lost contact with the coordinate input sub-region representing a clear contact state (step 380), a check is made to determine whether a neighbour coordinate input sub-region has generated a matching write event (step 382). If not, a clear contact state event is generated and recorded by the computer 110 at step 350. If a neighbour coordinate input sub-region has generated a matching write event, the write event is ignored (step 384).

Although each set 106 of cameras is shown communicating with an associated master controller 108, other processing configurations to triangulate pointer data derived from captured images may be used. For example, a single master controller 108 may be used to triangulate the pointer data generated by the cameras of each set 106. In this case, it is preferred that a synchronization signal be conveyed to each set of cameras simultaneously so that images of looking across the coordinate input sub-regions are captured at the same time.

Also, although the touch system 100 is described as including a projector associated with each coordinate input sub-region, it will be appreciated that other projector configurations may be used. For example, a single projector projecting an image that spans the touch surface 102 or other combinations of multiple projectors projecting overlapping images that span the touch surface 102 are suitable. In cases where multiple projectors are used, the projected images may overlap. For example, if desired, each projector may project an image spanning the entire touch surface 102, in which case each projected image fully overlaps. Alternatively, the projected images may only overlap in the transition zones. In this case, the projected images are blended at their edges within the transition zones $TZ_{1/2}$ and $TZ_{2/3}$ to provide a smooth and continuous image spanning the touch surface 102.

As will be appreciated by those skilled in the art, the overlapping coordinate input sub-regions need not be arranged in a horizontal row as shown. The coordinate input sub-regions may be arranged in a vertical column or arranged in an N×M matrix.

In the present embodiment, the touch surface and camera orientations are configured to maintain a 4:3 aspect ratio to conform to the shape of the coordinate input sub-regions. If the aspect ratio of the coordinate input sub-regions is equal to or less than 1, the intermediate cameras can be oriented so that the edges of their fields of view are vertical. Alternatively, in this case the orientation of the cameras can be maintained and their fields of view increased. In fact, the cameras can be oriented at virtually any angle provided their fields of view observe their assigned quadrants of the coordinate input sub-regions.

If desired, global attributes can be assigned to each pointer used to contact the touch surface 102 thereby obviating the need for tool trays associated with each coordinate input sub-region. Also, the computer 110 need not execute a desktop application that is presented in sections over the touch surface 102. Rather the computer 110 can execute and present a separate applications program on each coordinate input sub-region, while still permitting pointer properties to be carried over from one coordinate input sub-region to another.

Since the touch system 100 uses machine vision to detect pointers over the touch surface 102, the touch system 100 can support multiple users each using a pointer to contact the touch surface at different locations simultaneously. In this case writing input by different users using pointers is presented in the projected images typically using different colors or other visual differentiators although visually differentiating the user input is not necessary. When a pointer transition between coordinate input sub-regions is made resulting in multiple users contacting the same coordinate input sub-region, a decision algorithm based on proximity of last contact is used to differentiate the pointer contacts.

Figure 7:
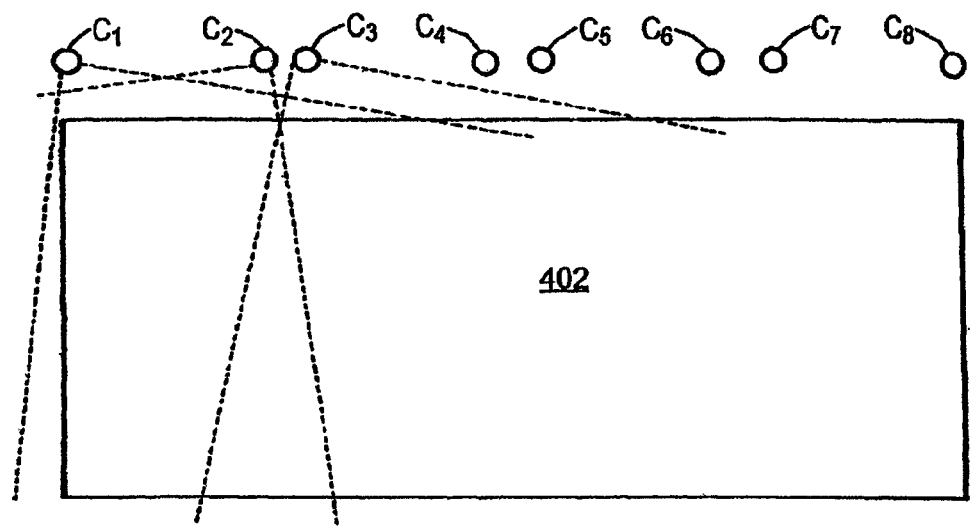
FIG. 7 is a front plan view of an alternative camera arrangement for capturing overlapping images looking across the touch surface.
Figure 8:
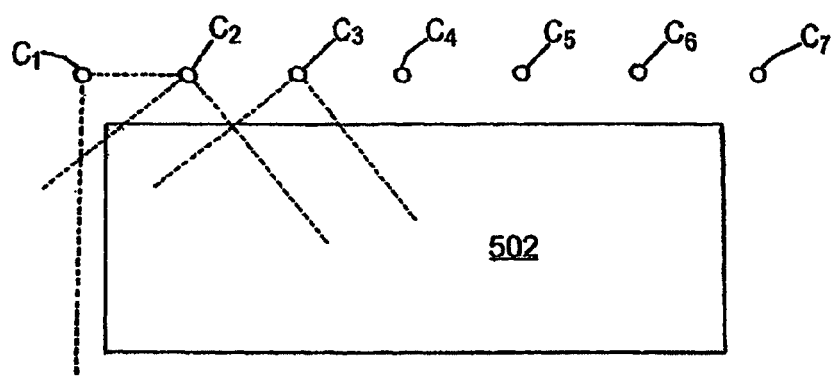
FIG. 8 is a front plan view of yet another alternative camera arrangement for capturing overlapping images looking across the touch surface.

Turning now to FIG. 7, an alternative camera arrangement for a large scale touch system is shown. In this embodiment, cameras $C_1$ to $C_8$ are only provided along the top of the touch surface 402 and look down across the touch surface. In particular, cameras are located at the top left and top right corners of the touch surface 402. Intermediate pairs of cameras are located at spaced locations along the top of the touch surface 402. The fields of view of the cameras are shown by the dotted lines. As can be seen, the fields of view of the cameras overlap so that each location on the touch surface 402 falls within the fields of view of at least two cameras. This of course allows a pointer to be tracked across the entire touch surface 402 using triangulation FIG. 8 shows yet another camera arrangement for a large scale touch system. In this embodiment, evenly spaced cameras $C_1$ to $C_7$ are positioned above the top edge of the touch surface 502 and look down across the touch surface. The fields of view of the cameras are shown by the dotted lines and as can be seen, the fields of view of the cameras overlap so that each location on the touch surface falls within the fields of view of at least two cameras. Again this allows a pointer to be tracked across the entire touch surface using triangulation. In fact in this embodiment, most locations on the touch surface 502 fall within the fields of view of more than two cameras allowing multiple triangulation results to be generated for each pointer contact. Depending on the pointer contact locations, different logic can be used to select the triangulation results to be used to determine the pointer contact location.

Figure 9A:
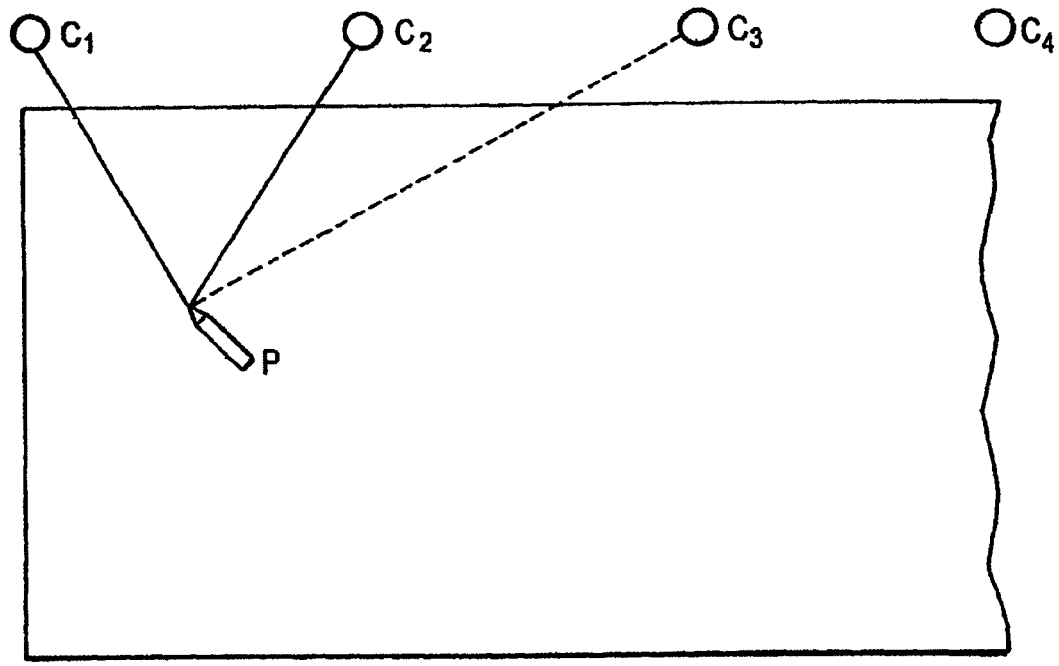
FIGS. 9a to 9c show different pointer contacts on the touch surface of FIG. 8.

For example, as shown in FIG. 9a, the position of pointer P on touch surface 502 can be calculated by triangulating pointer information derived from images captured by cameras $C_1$ and $C_2$ and possibly by triangulating pointer information derived from images captured by camera $C_3$. In this latter case pointer information derived from images captured by cameras $C_1$ and $C_3$ and cameras $C_2$ and $C_3$ can be triangulated resulting in multiple triangulation results. The multiple triangulation results can be averaged or processed according to other logic to yield a single pointer position. If camera $C_3$ is deemed to be too far from the pointer P, the camera $C_3$ can be ignored. Alternatively, pointer information derived from images captured by camera $C_3$ can be used to track the pointer to determine when the pointer reaches a certain proximity to the camera $C_3$. When the pointer reaches a certain proximity to the camera $C_3$, the pointer information derived from images captured by camera $C_3$ can be triangulated to determine the position of the pointer on the touch surface.

Figure 9B:
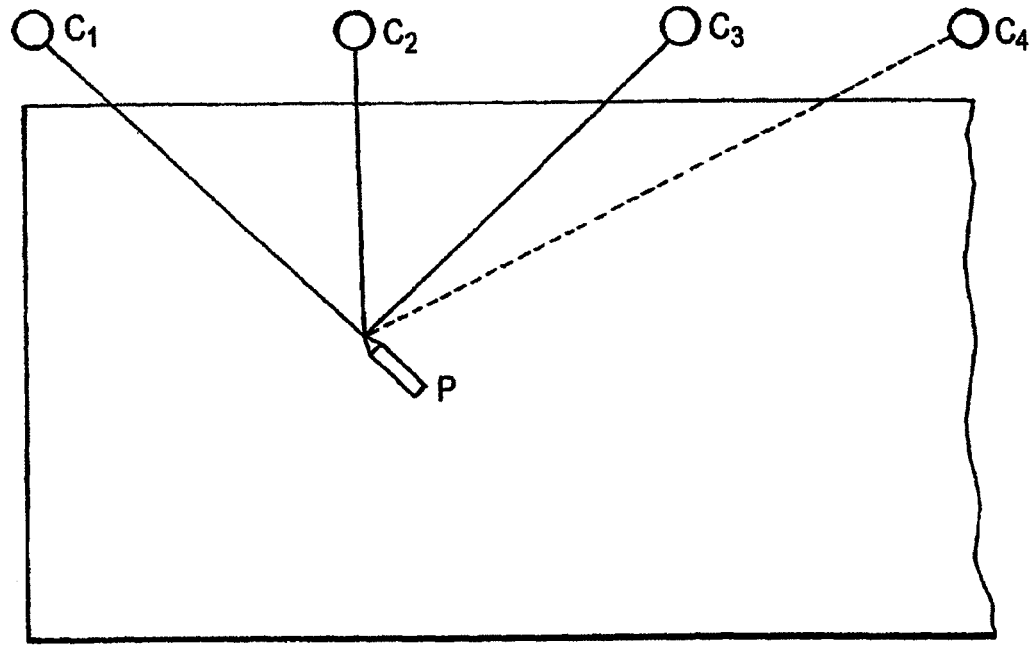
Figure 9C:
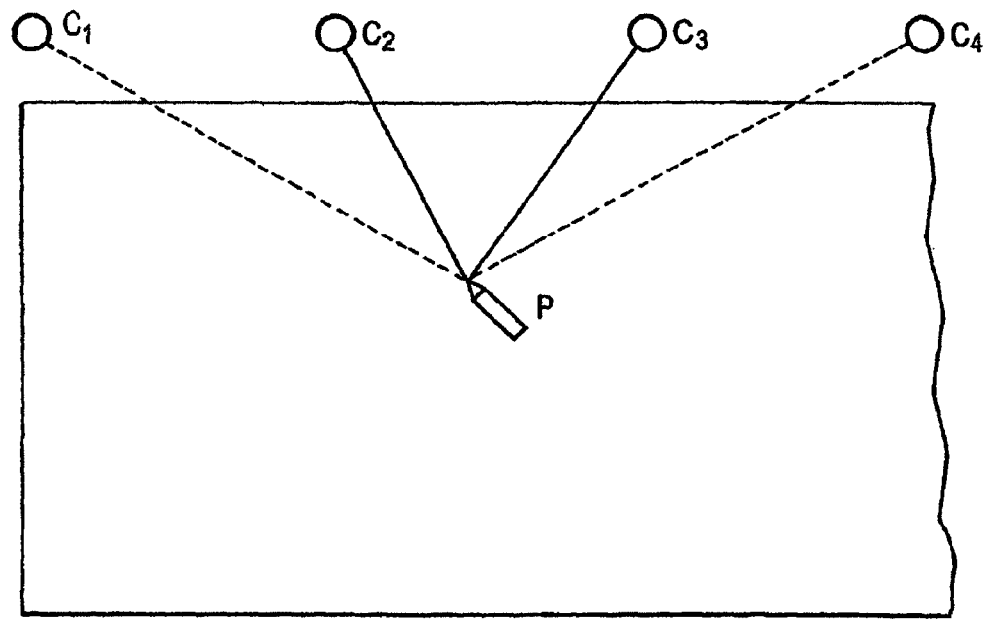

FIGS. 9b and 9c show other positions of pointers on the touch surface 502 and the various triangulation results that can be derived from images captured by the cameras. As will be appreciated, the areas on the touch surface 502 falling within the fields of view of different pairs of cameras are similar to the transition zones described with reference to the embodiment of FIGS. 1 to 6. Pointer contacts occurring within these areas can be treated in the same manner as described previously.

Those of skill in the art will appreciate that although the above embodiments show vision-based touch systems, the present method of tracking a pointer can be used in other types of touch systems having overlapping input regions defining transition zones.

Although embodiments of the present invention have been described with reference to the figures, those of skill in the art will appreciate that variations and modifications may be made without departing from the spirit and scope thereof as defined by the appended claims.

What is claimed is:

1. An interactive input system comprising:
   an input region divided into a plurality of input sub-regions, each of the input sub-regions configured to partially overlap with an adjacent input sub-region; and
   a plurality of sets of imaging devices, each set associated with a respective one of the plurality input sub-regions, the imaging devices of each set looking into the respective input sub-region from different vantages and having overlapping fields of view.

2. An interactive input system according to claim 1 wherein each set of imaging devices comprises at least two imaging devices.

3. An interactive input system according to claim 2 wherein said imaging devices are digital camera devices.

4. An interactive input system according to claim 2 wherein the imaging devices of each set are positioned generally along the periphery of the associated input sub-region.

5. An interactive input system according to claim 4 wherein the imaging devices of each set comprise a pair of laterally spaced imaging devices positioned along a common peripheral edge of the associated input sub-region.

6. An interactive input system according to claim 4 wherein the imaging devices of all sets are positioned along the same peripheral edge of the input region.

7. An interactive input system according to claim 6 wherein said imaging devices are digital camera devices.

8. An interactive input system according to claim 5 wherein a computer desktop section is displayed on each input sub-region, said computer desktop sections merging to form a substantially seamless computer desktop.

9. An interactive input system according to claim 6 wherein a computer desktop section is displayed on each input sub-region, said computer desktop sections merging to form a substantially seamless computer desktop.

10. An interactive input system according to claim 2 wherein each set of imaging devices comprises at least four imaging devices positioned at spaced locations to form the corners of a four-sided polygon encompassing said input sub-region.

11. An interactive input system according to claim 10 wherein imaging devices of at least some sets look into the associated input sub-region at different angles relative to a generally horizontal peripheral edge of said input region.

12. An interactive input system according to claim 11 wherein, for each set of imaging devices associated with an input sub-region adjacent an end of said input region, a first pair of imaging devices looks into the associated input sub-region at a first angle and a second pair of imaging devices looks into the associated input sub-region at a second different angle.

13. An interactive input system according to claim 12 wherein the imaging devices of said first pair are positioned at different corners of said input region and wherein the imaging devices of said second pair are positioned along opposite horizontal peripheral edges of said input region.

14. An interactive input system according to claim 13 wherein each imaging device of said first pair is aimed generally at a diagonally opposite imaging device of said second pair and wherein each imaging device of said second pair is tilted in a direction towards the diagonally opposite imaging device of said first pair.

15. An interactive input system according to claim 14 wherein the optical axes of the imaging devices of said first pair form about a 45 degree angle with respect to the horizontal peripheral edge and wherein the optical axes of the imaging devices of said second pair forming about a 10 degree angle with respect to a line normal to said horizontal peripheral edge.

16. An interactive input system according to claim 11 wherein a computer desktop section is displayed on each input sub-region, said computer desktop sections merging to form a substantially seamless computer desktop.

17. An interactive input system according to claim 14 wherein a computer desktop section is displayed on each input sub-region, said computer desktop sections merging to form a substantially seamless computer desktop.

18. An interactive input system according to claim 10 wherein each input sub-region is divided into quadrants, a different pair of imaging devices of the imaging device set associated with the input sub-region being responsible for each quadrant.

19. An interactive input system according to claim 18 wherein imaging devices of at least some sets look into the associated input sub-region at different angles relative to a generally horizontal peripheral edge of said input region.

20. An interactive input system according to claim 19 wherein, for each set of imaging devices associated with an input sub-region adjacent an end of said input region, a first pair of imaging devices looks into the associated input sub-region at a first angle and a second pair of imaging devices looks into the associated input sub-region at a second different angle.

21. An interactive input system according to claim 20 wherein the imaging devices of said first pair are positioned at different corners of said input region and wherein the imaging devices of said second pair are positioned along opposite horizontal peripheral edges of said input region.

22. An interactive input system according to claim 21 wherein each imaging device of said first pair is aimed generally at a diagonally opposite imaging device of said second pair and wherein each imaging device of said second pair is tilted in a direction towards the diagonally opposite imaging device of said first pair.

23. An interactive input system according to claim 22 wherein the optical axes of the imaging devices of said first pair form about a 45 degree angle with respect to the horizontal peripheral edge and wherein the optical axes of the imaging devices of said second pair forming about a 10 degree angle with respect to a line normal to said horizontal peripheral edge.

24. An interactive input system according to claim 21 wherein a computer desktop section is displayed on each input sub-region, said computer desktop sections merging to form a substantially seamless computer desktop.

25. An interactive input system according to claim 1 comprising at least three input sub-regions arranged side-by-side.

26. An interactive input system according to claim 25 wherein adjacent input sub-regions overlap.

27. An interactive input system according to claim 26 wherein each set of imaging devices comprises at least four imaging devices positioned at spaced locations to form the corners of a four-sided polygon encompassing said input sub-region.

28. An interactive input system according to claim 27 wherein imaging devices of at least some sets look into the associated input sub-region at different angles relative to a generally horizontal peripheral edge of said input region.

29. An interactive input system according to claim 28 wherein, for each set of imaging devices associated with an input sub-region adjacent an end of said input region, a first pair of imaging devices looks into the associated input sub-region at a first angle and a second pair of imaging devices looks into the associated input sub-region at a second different angle.

30. An interactive input system according to claim 29 wherein the imaging devices of said first pair are positioned at different corners of said input region and wherein the imaging devices of said second pair are positioned along opposite horizontal peripheral edges of said input region.

31. An interactive input system according to claim 30 wherein each imaging device of said first pair is aimed generally at a diagonally opposite imaging device of said second pair and wherein each imaging device of said second pair is tilted in a direction towards the diagonally opposite imaging device of said first pair.

32. An interactive input system according to claim 31 wherein the optical axes of the imaging devices of said first pair form about a 45 degree angle with respect to the horizontal peripheral edge and wherein the optical axes of the imaging devices of said second pair forming about a 10 degree angle with respect to a line normal to said horizontal peripheral edge.

33. An interactive input system according to claim 22 wherein a computer desktop section is displayed on each input sub-region, said computer desktop sections merging to form a substantially seamless computer desktop.

34. An interactive input system according to claim 27 wherein, for each input sub-region intermediate the ends of said input region, each imaging device in the set associated therewith is angled slightly towards the diagonally opposite imaging device in the set.

35. An interactive input system according to claim 33 wherein each imaging device is angled such that the optical axis thereof forms about a ten degree angle with respect to a line normal to said horizontal peripheral edge.

36. An interactive input system according to claim 31 wherein, for each input sub-region intermediate the ends of said input region, each imaging device in the set associated therewith is angled slightly towards the diagonally opposite imaging device in the set.

37. An interactive input system according to claim 36 wherein each imaging device is angled such that the optical axis thereof forms about a ten degree angle with respect to a line normal to said horizontal peripheral edge.

38. An interactive input system according to claim 34 wherein a computer desktop section is displayed on each input sub-region, said computer desktop sections merging to form a substantially seamless computer desktop.

39. An interactive input system according to claim 27 further comprising an illuminated bezel about the periphery of said input region, said imaging devices being accommodated by said bezel.

40. An interactive input system according to claim 39 wherein, for each set of imaging devices associated with an input sub-region adjacent an end of said input region, a first pair of imaging devices looks into the associated input sub-region at a first angle and a second pair of imaging devices looks into the associated input sub-region at a second different angle.

41. An interactive input system according to claim 40 wherein the imaging devices of said first pair are positioned at different corners of said input region and wherein the imaging devices of said second pair are positioned along opposite horizontal peripheral edges of said input region.

42. An interactive input system according to claim 41 wherein the optical axes of the imaging devices of said first pair form about a 45 degree angle with respect to the horizontal peripheral edge and wherein the optical axes of the imaging devices of said second pair forming about a 10 degree angle with respect to a line normal to said horizontal peripheral edge.

43. An interactive input system according to claim 40 wherein, for each input sub-region intermediate the ends of said input region, each imaging device in the set associated therewith is angled slightly towards the diagonally opposite imaging device in the set.

44. An interactive input system according to claim 43 wherein each imaging device is angled such that the optical axis thereof forms about a ten degree angle with respect to a line normal to said peripheral edge.

45. An interactive input system according to claim 39 further comprising light sources adjacent imaging devices located at intermediate positions between the ends of said input region, said light sources being generally in line with said illuminated bezel.

46. An interactive input system according to claim 45 wherein a computer desktop section is displayed on each input sub-region, said computer desktop sections merging to form a substantially seamless computer desktop.

* * * * *